Nov. 30, 1926.

E. V. HARRIMAN

CAMERA

Filed Oct. 19, 1925

Inventor
Edward V. Harriman

By Hardway & Cathey
Attorney.

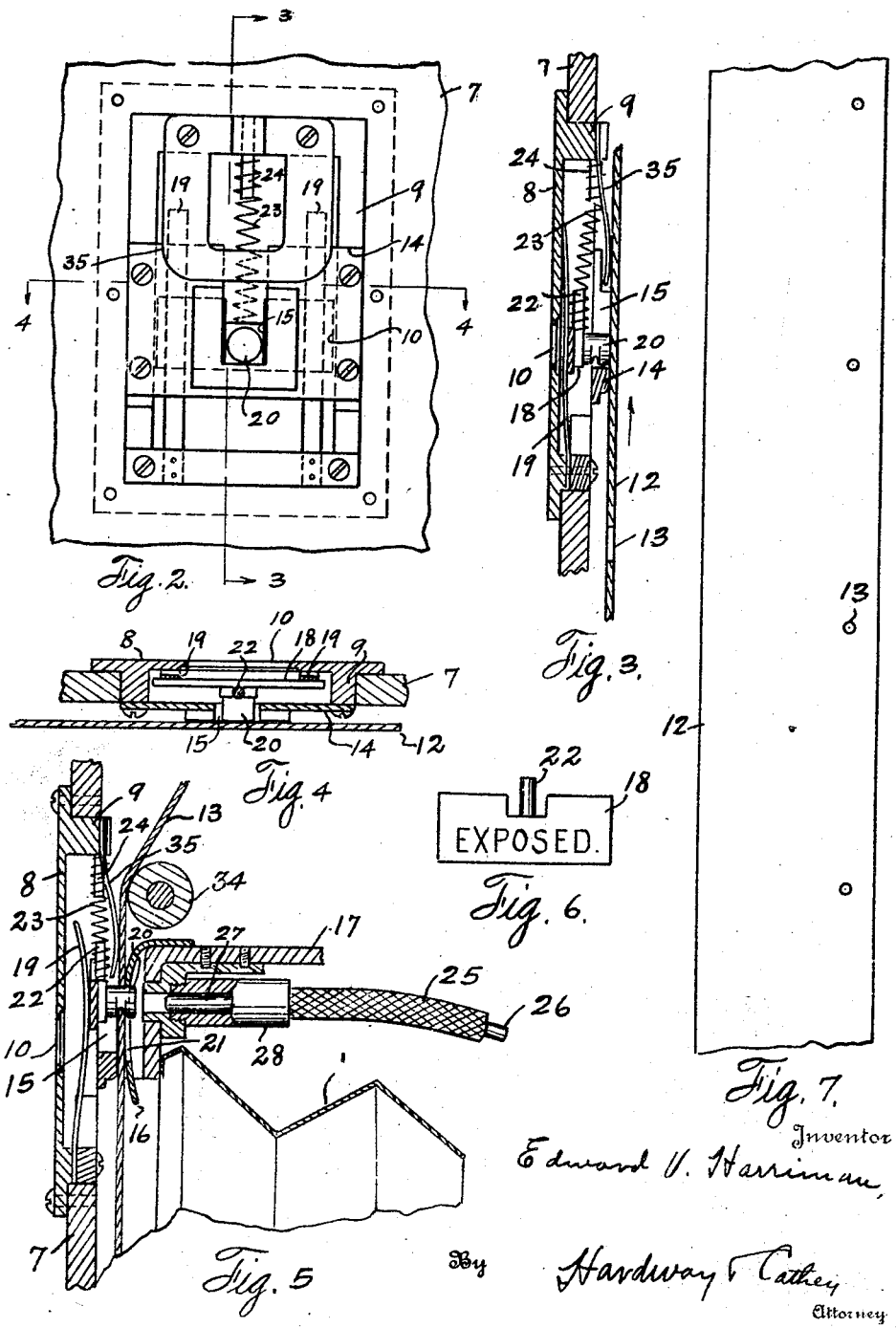

Patented Nov. 30, 1926.

1,608,596

UNITED STATES PATENT OFFICE.

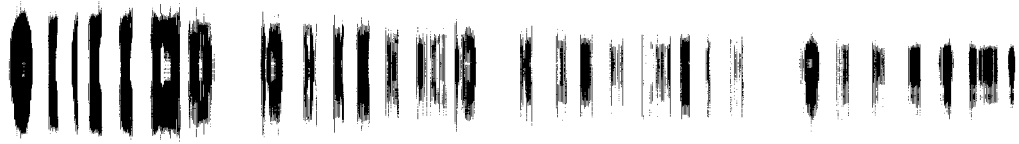

EDWARD V. HARRIMAN, OF HOUSTON, TEXAS.

CAMERA.

Application filed October 19, 1925. Serial No. 63,339.

This invention relates to new and useful improvements in a camera.

One object of the invention is to provide an improved type of camera, of that type designed to produce a succession of negatives on a sensitized film.

Another object of the invention is to provide a camera of the character described equipped with a mechanism which will at all times indicate whether that section of the film opposite the lens of the camera has been exposed or not.

A further feature of the invention is to produce a device of the character described which is of simple construction and accurate in operation.

With the above and other objects in view this invention has particular relation to certain novel features of construction, operation and arrangement of parts an example of which is given in this specification and illustrated in the accompanying drawings, wherein:—

Figure 2 shows an enlarged fragmentary inside elevational view of the rear wall of the camera casing.

Figure 3 shows a vertical sectional view, taken on the line 3—3 of Figure 2.

Figure 4 shows a cross sectional view taken on the line 4—4 of Figure 2.

Figure 5 shows a fragmentary vertical sectional view of the camera also taken on the line 3—3 of Figure 2.

Figure 6 shows a rear view of the indicating slide employed, and

Figure 7 shows a section of the sensitized film employed.

Figure 1:
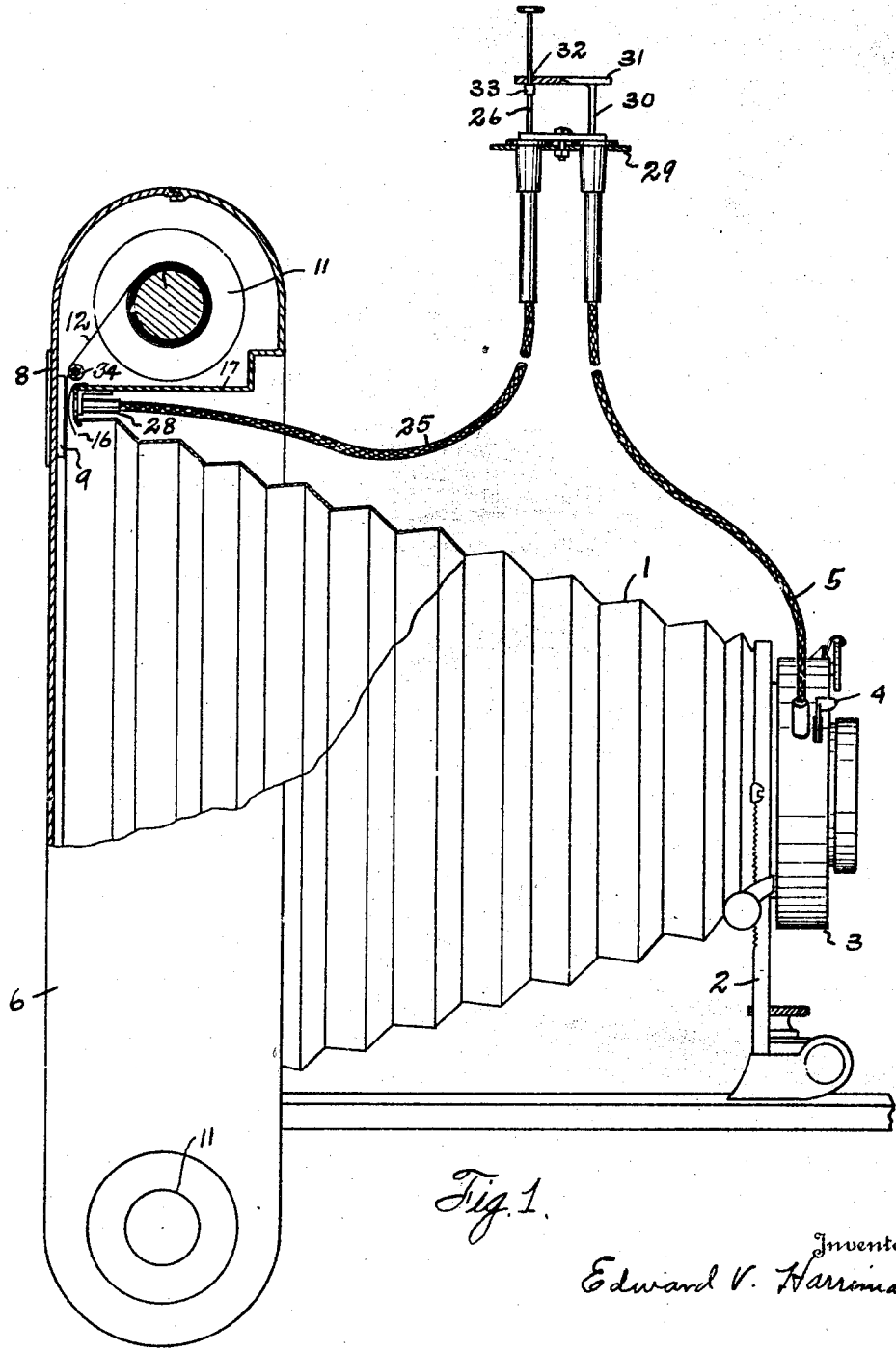
Figure 1 shows a side view of a camera, partly in section, showing the improved indicating mechanism applied thereto.

Referring now more particularly to the drawings, wherein like numerals of reference designate similar parts in each of the figures the numeral 1 designates the type of camera, taken as a whole. The numeral 2 designates the front board of the camera The coverplate 8 has a transverse display window 10 therethrough, for a purpose to be hereinafter stated.

The body 6 is provided with the removable film spools 11, 11, whereon the sensitized film 12 is wound in the usual way. This film has the spaced marginal perforations 13 for a purpose to be hereinafter stated. This film is unwound from one spool and wound onto the other in the conventional manner, passing over and being held in proper relation behind the lens by suitable idler rollers as 34.

Secured to the rib 9 there is a transverse plate 14 whose upper edge has a deep, vertical slot 15 and spaced in front of this plate there is a flexible pressure plate 16 whose upper end is anchored to the transverse partition 17 and whose lower end is free. The film passes between said plates 14 and 16 and is held firmly against the former by the latter. The numeral 18 designates an indicating slide and there are the long flexible fingers 19, 19, whose lower ends are anchored to the bottom rib 9 and whose upper ends are free, said fingers pressing against the rear side of the slide 18, one at each end thereof. The slide 18 has a forwardly projecting stud 20 adapted to work through the slot 15 and also through the vertically elongated slot 21 in the pressure plate 16. The slide 18 also has an upstanding pin 22 provided to receive and anchor the lower end of the coil spring 23 whose upper end is fitted over the pin 24 depending from the rib 9 above.

The stud 20 is in the line of travel of the perforations, and as shown in Figure 5 is projected through one of said perforations and the slide 18 is above and out of alignment with the window 10 and the stud 20 is in its upper position at the upper end of the slot 21, the film in this figure being in position for another exposure. There is also a release cable 25 of conventional construction and embodying a flexible release Nov. 30, 1926. 1,608,604
G. LOECK
DEVICE FOR PHOTOGRAPHING THE INTERIOR OF TUBES AND CAVITIES IN THE BODY
Filed July 8, 1925
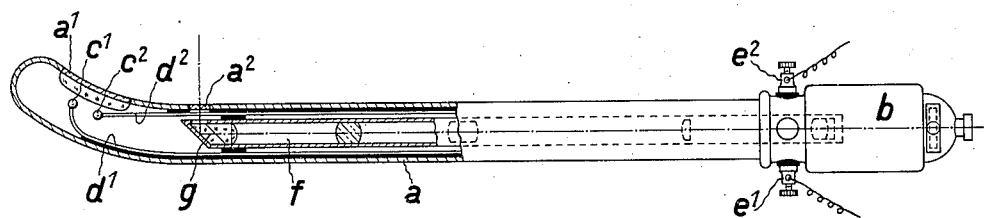
Inventor:
Günther Loeck